United States Patent Office 3,074,902
Patented Jan. 22, 1963

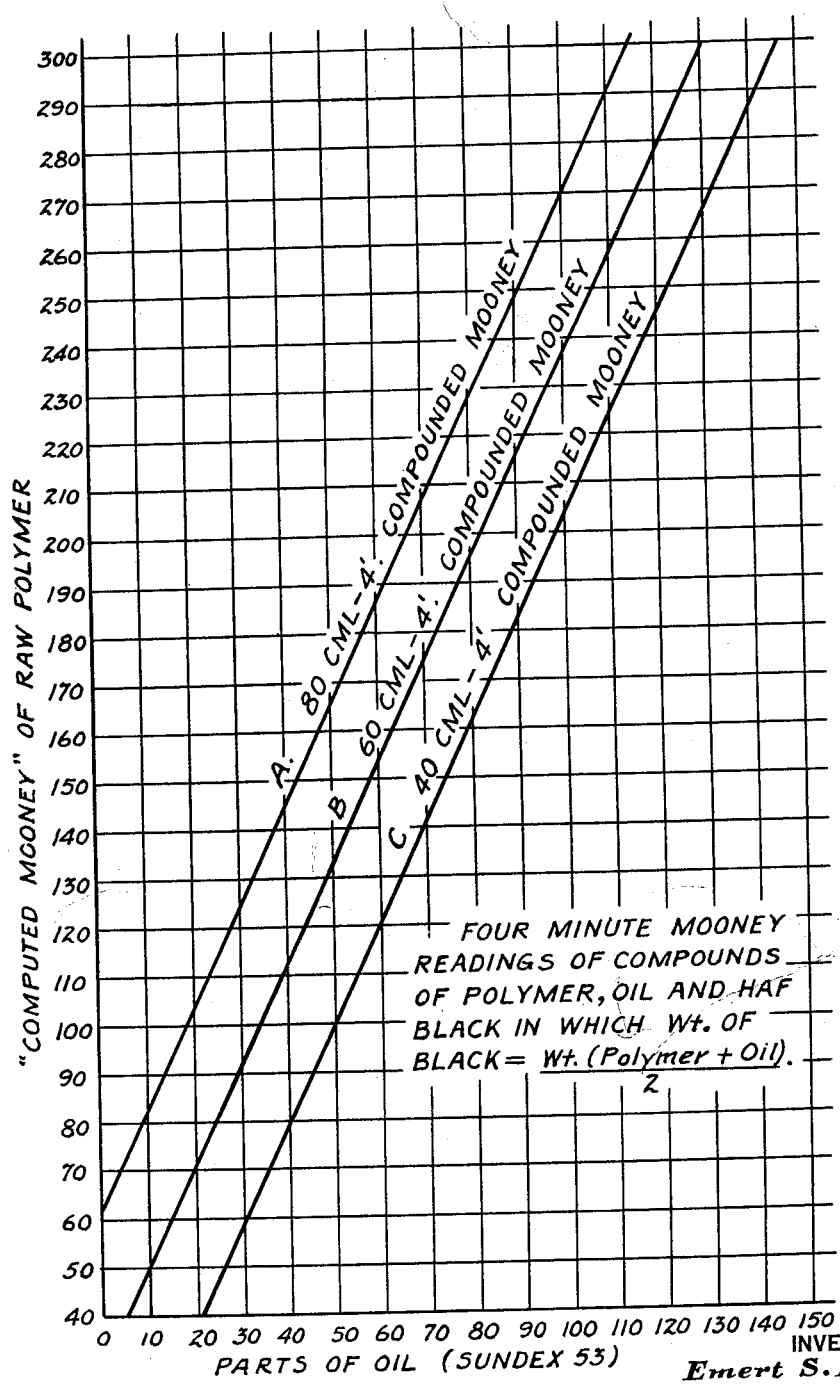

3,074,902
PROCESS OF POLYMERIZING A CONJUGATED DI-
OLEFIN POLYMER IN THE PRESENCE OF AN
OILY LIQUID HYDROCARBON PLASTICIZER
AND AN ALFIN CATALYST
Emert S. Pfau, Cuyahoga Falls, and Gilbert H. Swart and
Kermit V. Weinstock, Akron, Ohio, assignors, by mesne
assignments, to The General Tire & Rubber Company,
Akron, Ohio, a corporation of Ohio
Original application Nov. 20, 1950, Ser. No. 196,584, now
Patent No. 2,964,083, dated Dec. 13, 1960. Divided
and this application May 27, 1955, Ser. No. 511,524
2 Claims. (Cl. 260—33.6)

The present invention relates to a process of producing a synthetic rubber compound suitable for use in the manufacture of pneumatic tires, the present application being a division of our copending application Serial No. 196,584, filed November 20, 1950, now Patent No. 2,964,083, granted December 13, 1960.

Only a few types or a few varieties of the many various types of synthetic rubber have been considered suitable for the manufacture of tires and in particular the treads of tires. This is because the rubber characteristics or qualities for tire treads are exacting and difficult to meet. Tire treads must be of uniform weight and cross-section; they must wear well and resist cracking both due to flexing and light; they must have substantial tensile strength and toughness. These qualities are had only in rubber compounds of the highest quality. Only highest quality rubber compounds are therefore used for good tires whereas in mechanical goods and especially in rubber footwear cost per unit of compound weight and not quality is the controlling factor.

Even though quality is of prime importance in tires, it is essential that tires be capable of being made in volume and to make tires in volume it is necessary that the rubber compounds used be capable of extrusion through an orifice (including calendering which is, in fact, extrusion through a die having rotating sides). It is only by such extrusion processes that tire treads have been made in volume and with uniformity.

Naturally, the rubber must be rendered sufficiently plastic for extrusion by apparatus of a rubber factory. Synthetic rubbers may be produced in a relatively tough state or in a relatively more plastic state as desired by simply regulating the percent of modifier. For example, a long chain mercaptan may be present in the mixture and the polymerization stopped at a point where the desired rubber is obtained. Larger amounts of mercaptan and lower degrees of conversion give more plastic synthetic rubbers with less cross-linking or gel formation.

We have found that the tough rubbers which were considered unprocessable and not suitable for making extruded tire treads in production may be mixed with relatively large amounts of one or more compatible oils or plasticizers to provide compounds of exceptional quality. Such compounds containing large amounts of softener have produced tire treads superior to those produced with the general purpose GR–S rubbers heretofore available and at very much reduced cost. The present invention provides a process of producing workable synthetic rubber compounds in which synthetic polymers normally too tough for processing are made workable by interspersing through them sufficient amount of an oily plasticizer to reduce the viscosity of the polymer enough to enable it to be readily processed by means of conventional rubber working machinery. In the process of the present invention the compounds which are polymerizable to produce the desired polymer are mixed with an oily plasticizer and polymerized in the presence of an ionic catalyst which may be any one of the well known Alfin catalysts, i.e. a complex of the sodium compounds of an alcohol and an olefin.

In the compounding of the synthetic rubber-oil mixtures the total quantity of oil plus synthetic rubber is considered to be rubber. By this method compounds formed in accordance with the present invention generally have hardness and physical characteristics similar to normal compounds made from commercial easy processing synthetic rubbers. To illustrate this, a good tread compound having 100 parts of rubber and 50 parts of carbon black generally gives properties which are desirable. Using tough rubber-oil combinations with 100 parts of rubber and 100 parts of oil, we would utilize 100 parts of the carbon black for about equal hardness and comparable properties.

Proper characterization of a given polymeric material may not always be made directly by means of a Mooney plastometer reading on the raw polymer, as gel content, gel distribution, and molecular weight affect the polymer and are not indicated by a Mooney plastometer. When a polymer is exceptionally tough so that it would have a Mooney reading about 120, slippage between the rotor and polymer frequently occurs with the result that the Mooney reading may be in error and not reliable. Furthermore, when the tough particles are distributed within softer particles of a rubbery polymer or when a non-homogeneous or a gel containing polymer is had, the Mooney plasticity reading frequently fails to characterize the polymer. Thus, while a Mooney plastometer is satisfactory in distinguishing between rubbers having no gel but of varying molecular weights until the Mooney reading is about 120 (where slippage or tearing may occur), it fails to distinguish between such rubbers and rubbers having substantial gel content. Gel containing rubbers require substantially increased amounts of plasticizer.

Reference should be had to the accompanying drawing in which:

FIGURE 1 is a graph in which the plasticities of various raw polymers are plotted against the amount of oil in compounds of the same polymer containing oil and carbon black in an amount equal to one half the combined weight of the polymer and oil to provide compounds having plasticities of 40, 60 and 80 measured as indicated on a Mooney plastometer.

We have found that in any given polymer modified so as to have substantially no gel, the amount of oil required to obtain a compound of a given plasticity varies directly with its Mooney plasticity and directly with its intrinsic viscosity. Thus, there is a substantially straight line relationship between the amount of a given oily plasticizer required to obtain a given compounded Mooney and the raw Mooney reading when plotted as illustrated in FIG. 1 providing a given carbon black such as a fine reinforcing furnace black, for example "Philblack O" (a structural type of fine high abrasion furnace black of the Phillips Petroleum Company) is utilized and the amount of the carbon black is equal to a given percentage of the total weight of rubber plus oily plasticizer say 50 percent of the total of these two materials. We have also found that the compounded Mooney of a given polymer varies in approximately a straight line relationship with the amount of a given oily plasticizer contained therein. If therefore, the polymers are of a non-gel type, and vary only by molecular weight as indicated by intrinsic viscosity measurements, then the curves obtained by plotting parts of oil necessary to obtain a given compounded Mooney (CML–4′) versus measured raw Mooney of the polymer are approximately parallel lines, especially when the accuracy of duplication and measurement is considered. We have made use of this fact as hereinafter further explained to develop the term "computed Mooney" which applies to all synthetic rubbery polymeric materials, regardless of how they are obtained. The "computed Mooney" of a gel containing polymer is the true Mooney of an equivalent gel free polymer. In FIGURE 1 calculated or "computed Mooney" is plotted versus parts of oil (Sundex 53) required in the various gel free polymers to obtain compounded Mooney values of approximately 40, 60, and 80 as shown by lines A, B, and C respectively with a short mixing cycle of not more than 12 minutes as hereinafter described. The computed Mooney and the measured raw Mooney are the same within accuracy of measurement at the lower values, i.e., below 120 for these gel free polymers.

In order to properly prepare tires and particularly extruded treads of tires, the compounded Mooney of the compounds used should generally lie between 40 and 80. When the rubber compound is too plastic (too low a Mooney, for example much below 40) difficulty is had in holding shapes and when the compound is not sufficiently plastic, i.e., has over 80 Mooney, great difficulty is had in overheating and scorching in the extruding operation as had in a calender tuber or the like necessary for forming extruded tire treads of uniform section. It is preferred that the compounded Mooney of the rubber compound be within the range of 50 to 70. Line B, the curve for compounded Mooney values of 60 is therefore squarely in the center of the range preferred for factory processing. The slope of this line was obtained by plotting the measured raw Mooney reading of gel free polymers against the amount of oil required to obtain a compound with a 60 CML-4' (compounded Mooney of 60 measured with the large rotor at four minutes). Slopes and positons for 40 CML-4', and 80 CML-4' lines were obtained in the same manner except that the compounds were made to 40 and 80 compounded Mooney respectively. One may find "computed Mooney" of a given polymer utilizing the graphs of FIGURE 1 by preparing a rubber carbon black mixture with a given amount of oil utilizing the mixing procedure described below and measuring the Mooney of the compound in the ordinary manner using the large rotor of a standard Mooney plastometer and reading the value at four minutes.

If the measured four minute compounded Mooney (CML-4') of the compound falls in the neighborhood between 40 to 80 i.e. near any of lines A, B, and C the "computed Mooney" may be simply read from the scale designated "computed Mooney" using standard interpolation or extrapolation procedures. If the measured compounded Mooney is substantially removed from the range of 40 to 80 another compound with greater or less oil may be prepared showing a compounded Mooney closer to this range and the amount of oil and actual Mooney level may thereupon be read by interpolation procedures.

As above explained, sample compositions, made for the purpose of computing the Mooney viscosity of a polymer, have a fine reinforcing-furnace carbon black (a high abrasion furnace black) content equal to one-half the combined polymer and oil content. As shown in FIG. 1, a sample having 30 parts by weight of oil to 100 parts by weight of polymer and a measured Mooney plasticity of 60, would have 65 parts by weight of said carbon black and the computed Mooney plasticity of the polymer would be approximately 90. It will be apparent that the polymer of any sample having 30 parts of oil and 65 parts of said carbon black and a measured Mooney plasticity greater than 60 will have a computed Mooney plasticity above 90. Conversely, a sample with 30 parts of oil and 65 parts of said furnace carbon black to 100 parts of a polymer of above 90 computed Mooney plasticity, will have a measured Mooney plasticity greater than 60. As will be seen from the graph in FIG. 1, a similar relationship holds true for samples requiring various oil contents to bring them to a workable plasticity. For example, the polymer of a sample composed of 100 parts of the polymer, 40 parts of oil and 70 parts of said carbon black that has a measured Mooney plasticity of 60, has a computed Mooney plasticity of approximately 110; the polymer of a sample composed of 100 parts of the polymer, 50 parts of oil and 75 parts of said furnace carbon black that has measured Mooney of 60, has a computed Mooney plasticity of about 130; and the polymer of a sample composed of 100 parts of the polymer, 60 parts of oil and 80 parts of said furnace black that has a measured Mooney of 60 has a computed Mooney of about 150.

In preparing rubber compounds for evaluation the tough rubber is incorporated in a warm laboratory Banbury mixer (approximately 200° F.) worked for about one minute whereupon the tough rubber tends to break into fine crumbs which will not work into a cohesive mass in the Banbury. The oil is added in one or two increments depending on the amount of softener used and worked for four to six minutes. The oil should preferably be absorbed in the rubber before any carbon black is added, but the black can be added before the oil is completely absorbed if desired. When the Mooney polymer fails to break-up into a fine crumb in the Banbury a small amount of the black may be added initially to insure the formation of a fine crumb. The carbon black is added in several increments and worked four or five minutes until a fairly cohesive mass is obtained. Cold water is preferably circulated through the Banbury during the carbon black addition in order to prevent excessive temperature rise. The total mixing time should be only that required to obtain a cohesive mass. The mix should immediately be placed in a cold tight laboratory mill. (6" x 12" rolls) and milled for about two minutes at .050 separation of rolls allowed to cool one-half hour and the compounded Mooney determined. When the rubber compound is to be used for the production of rubber articles the usual compounding ingredients may be added on a second pass through the Banbury mixer requiring about two to four minutes for the addition of the materials.

We have found that for any given "computed Mooney" reading or for any given actual measured Mooney in a given type of polymer there is a minimum amount of oil which is required for satisfactory processing without long and uneconomical mastication cycles and mixes. When the rubber into which the oil or other plasticizer is incorporated has a computed Mooney of 90, about 30 parts of oil or other liquid softener are usually required for each 100 parts of rubber to obtain a 60 Mooney compound (60 CML-4') and 20 parts of oil are required to obtain a 70 CML-4' which is on the least plastic side of the more desirable factory processable range. Where the benefits of the present invention become more impressive i.e. at "computed Mooney" above 115, at least 30 parts of oil are usually required to obtain a factory processable 70 Mooney compound and about 40 parts for a 60 Mooney compound using the 50 parts of black per 100 parts of rubber. When the "computed Mooney" plasticity (if the compound is gel free and prepared at low temperature) or when the measured Mooney is about 120, at least 35 parts and preferably about 40 parts of oil is desirable in order to provide the desired factory processibility. When the "computed Mooney" plasticity of the rubber is 150 or above, at least 45 to 50 parts of the oil are required to obtain the same processibility, and as much as 75 parts by weight of oil may be present per 100 parts by weight of a synthetic rubber without giving tire treads having inferior properties to those made from standard GR-S as presently manufactured. Even more oil, say 100 parts may be used when the black or pigment content is increased above the 50 percent of oil plus black which loading we have found to be exceedingly satisfactory. When the Mooney plasticity reads about 150, 50 to 75 parts of oil are generally most desirable for high quality tire treads. As much as 200 or even 250 parts of oil or other plasticizer may be used in some compounds with 100 parts of the toughest rubbers to obtain products of surprising value combined with low cost.

It has been our experience that synthetic rubbers having a computed Mooney of appreciably over 70 cause great difficulty in factory handling and have been considered undesirable for factory use without premasticating or deteriorating treatments. When the computed Mooney is 80 or above, factory handling according to prior methods has been substantially impossible. The maximum benefits of the present invention are obtained with synthetic rubbers having computed Mooney much above those which are considered useable in factory production although substantial benefits of the present process are obtained when the computed raw Mooney of the synthetic rubber used is as low as 85.

Greater benefits are obtained in accordance with the present invention when the computed Mooney of the raw polymer is 100 or more as the amount of oil used to obtain substantially the same properties is considerably increased without disadvantage and greater economies are effected. The low temperature properties of the rubber compound when the preferred low temperature plasticizers are used are improved with increased plasticizer content. The major benefits of the present invention are obtained when the Mooney plasticity is more than 115 or the measured Mooney of a gel free polymer is more than 115, all Mooney being measured with a large rotor at four minutes in accordance with standard procedure.

We preferably prepare polymers with Mooney plasticity of 150 or more in order to use large volumes of inexpensive oil and obtain the tread wear inherent in these unbroken-down polymers. It is as aforementioned, preferred that these very high Mooney rubbers are polymers prepared by low temperature polymerization processes utilizing a highly accelerated system.

The synthetic rubbers to which the present invention relates are polymers of conjugated diolefinic compounds such as butadiene, isoprene, chloroprene, cyanoprene, dimethylbutadiene etc. having not in excess of and preferably less than eight carbon atoms. Copolymers of one or more diolefinic compounds such as those aforementioned with one or more copolymerizable mono-olefins such as the arylolefinic compounds such as alpha-methylstyrene, 3,4-dichloro-alpha-methylstyrene, p-acetyl-alpha-methylstyrene, and including the arylvinyl compounds such as styrene and halogenated and nuclearly methylated styrenes such as 2,5 or 3,4-dichlorostyrene, 3,4-dimethylstyrene, 3-chloro 4-methylstyrene and unsaturated polymerizable ketones such as methylisopropenylketone, and methylvinylketone.

In the copolymers the total proportion of butadiene and/or other conjugated diolefinic compounds is ordinarily at least 50 percent of the weight of the copolymer. However, we have been able to prepare a very desirable rubbery material by adding oil thereto with as much as 85 percent of monoolefinic compounds such as styrene and 15 percent of butadiene or total conjugated diolefinic compound. Such materials are not suitable for tire treads but are the subject matter of related applications intended to be filed shortly.

The plasticizer should be compatible with the synthetic rubber and any compatible plasticizer even solid or semi-solid plasticizers may be used. However, liquid or oily plasticizers are generally considerably superior and liquid plasticizers with a low pour point are ordinarily much superior for low temperature rubbers. In the case of synthetic rubers made from butadiene or a conjugated diolefin and styrene and in other hydrocarbon rubbers generally, including polybutadiene and polyisoprene, the plasticizer is preferably a mineral oil having a boiling point well above temperatures to be encountered in use. For ordinary usage the plasticizer should not boil below 450° F. and preferably should not boil below 550 or 600° F. Of these, those mineral oils having a low aniline point or high aromatic content are much preferred, especially when the rubber contains styrene or has appreciable amounts of aromatic components.

The plasticizers listed below in Table 1 have been used in the practices of the present invention. The hydrocarbon plasticizers, and phenols substituted by unsaturated aliphatic compounds are preferred for hydrocarbon polymers or hydrocarbon synthetic rubbers. The various plasticizers or oils are not therefore equivalent but we have found them useful in obtaining various desirable specific properties in the compounds formed from the high Mooney rubbers. The folowing are examples of the various types of plasticizers showing identifying data, trade names, manufacturers or suppliers and relative "heat loss" after exposing the oil for the time indicated at 300° F.

Table 1

| Oil | Manufacturer | Pour point | Flash point | Aniline point | Boiling range | Heat loss at 300° F. | |
|---|---|---|---|---|---|---|---|
| | | | | | | 1 hr. | 3 hrs. |
| Sundex 53 (a dark aromatic and naphthenic blend lubricating oil extract consisting of 76% aromatic hydrocarbons and 26% naphthenic hydrocarbons. It has Saybolt viscosity at 210° F. of 90 seconds, a specific gravity of .97. Some of the hydrocarbons have aliphatic unsaturation). | Sun Oil Co | 70° F | 380° F | 130° F | | 3 | 6 |
| Dutrex 6 (a complex high mol. weight aromatic and unsaturated hydrocarbon petroleum oil having no volatiles or asphaltic residue and having a specific gravity of 1.02 and a Saybolt viscosity at 212° F. of 142). | Shell Development | | | | +600° F | 1 | 2 |
| Dutrex 7 (a hydrocarbon plasticizer of heavy process oil type derived from petroleum and having a specific gravity of 1.0 and a Saybolt Universal viscosity of 142 at 212° F.). | Shell Development | | 440° F | | | 1 | 2 |
| Circosol 2XH (a light green viscous hydrocarbon liquid having the specific gravity of .94, Saybolt viscosity at 100° F. of about 200 seconds and at 210° F. of about 85 seconds. It is a naphthenic type hydrocarbon containing some aromatic oil. It is predominantly naphthenic). | Sun Oil Co | +10° F | 430° F | 181° F | +700° F | 1 | 3 |
| Califlux GP (blend of unsaturated components of naphthenic base petroleum. It has a specific gravity of 1.01 and a Saybolt viscosity at 210° F. of 110 seconds). | Golden Bear Oil Co | 45° F | | 34° C.[1] | +665° F | 4 | |
| Sovaloid N (dark brown mineral oil containing about 80% of aromatic hydrocarbons and containing some naphthenic hydrocarbons. It has a specific gravity of 1.03, a Saybolt Universal viscosity of 44 at 210° F.). | Socony Vacuum | Below 0° F | 350° F | 115 [1] | +600° F | 14 | |
| Sovaloid C (synthetically produced entirely aromatic hydrocarbon petroleum oil having a specific gravity of 1.06, a Saybolt Universal viscosity at 110° F. of 36). | Socony Vacuum | 10° F | 320° F | 66 [1] | +580° F | 2 | |

Table 1—Continued

| Oil | Manufacturer | Pour point | Flash point | Aniline point | Boiling range | Heat loss at 300° F. 1 hr. | Heat loss at 300° F. 3 hrs. |
|---|---|---|---|---|---|---|---|
| Cardolite 625 (cardanol stated to be the monophenolic component of commercial cashew nut shell oil. Cardolite 625 is ethyl ether of cardanol. Some unsaturation in side chain). $C_2H_5O-\langle\text{ring}\rangle-C_{15}H_{23}$ | Irvington Paint & Varnish Co. | | | | | 6 | 14 |
| Hercoflex (octyl-decyl phthalate) | | | | | | 1 | 2 |
| Dioctyl phthalate | | | | | | 2 | 6 |
| QXS158B (naphthenic light distillate) | Imperial Oil Co. | | 325 | 162 | | 14 | 29 |
| QXS158D (refined naphthenic light distillate) | Imperial Oil Co. | | 345 | 172 | | 1 | 2 |
| QXS158E (refined naphthenic heavy distillate) | Imperial Oil Co. | | 470 | 207 | | 9 | 28 |
| QXS158F (highly refined naphthenic light distillate). | Imperial Oil Co. | | 345 | 207 | | 1 | 1 |
| QXS158G (highly refined naphthenic heavy distillate). | Imperial Oil Co. | | 490 | 270 | | 7 | 17 |
| QXS158H (asphaltic plasticizer (processed cracked tar)). | Imperial Oil Co. | | 315 | | | 16 | 33 |
| Liquid Poly B.D. (low molecular weight polybutadiene). | Phillips Petroleum Co. | | | | | 7 | 10 |
| ASTM#1 (ASTM Standard Oil) | | | 470° F. | 124° C. | | 1 | 2 |
| ASTM#2 (ASTM Standard Oil) | | | 475° F. | 93° C. | | 1 | 3 |
| ASTM#3 (ASTM Standard Oil) | | | 350° F. | 70° C. | | 15 | 26 |
| TP90B (high molecular weight liquid oily polyether). | Thiokol Corporation | | | | | 4 | 34 |
| Harflex 500 (phenyl oleate) | Binney & Smith | | | | | 4 | 9 |
| Flexol 8N8 ($C_7H_{15}COO-C_2H_4)_2NCOC_7H_{05}$) | Carbon & Carbide Co. | | | | | 4 | 10 |
| Circle light oil (more volatile than Circosol 2XH and more aromatic hydrocarbons. It is a petroleum distillate obtained after the cracking process). | Sun Oil Company | Below 0° F. | 325° F. | 157° F. | | 12 | 30 |
| Neville heavy oil (aromatic hydrocarbons largely derived from thermal decomposition of coal or oil). | Neville Company | | | 28.2 [1] | | | |
| Diamond process oil (low pour point oil largely paraffinic. It is a petroleum distillate obtained after the cracking process has a specific gravity of .883, a flash point of 360, a viscosity at 100° F. of 100, and at 210° F. of 39, an aniline point of 1.79, and a pour point of 15° to 20° F.). | Standard Oil Company | | | | | | |
| Resinex 14 (polymerized aromatic resins from cracked petroleum oils. Coumarone-indene). | Hawick Standard Chemicals | | | | | | |
| Cardolite 7625 (ethyl ether of vacuum distilled Cardanol). It has two aliphatic double bonds per mol (Cardolite 625 has 0.8 double bond per mol). | Irvington Paint & Varnish Company. | | | | | 3 | 11 |
| Cardolite 6583 (benzyl ether of Cardanol. Same as Cardanol #625 except the benzyl group is substituted for the ethyl group). | Irvington Paint & Varnish Company. | | | | | 5 | 9 |

[1] Mixed aniline point.

The polymers having a high "computed or calculated Mooney" as aforedescribed may be prepared by any of the polymerization processes including emulsion and mass free radical polymerization processes and also by the ionic polymerization process including both the alfin catalyst process and the Friedel-Crafts catalyst process.

In connection with the so-called alfin process wherein the polymerization is conducted with the alfin catalyst as described in Rubber Age, volume 65, page 58, 1949, in the presence of a solvent or diluent, the oily plasticizer, particularly if it is a mineral oil may be substituted for all or part of the diluent or solvent. The alfin rubbers have heretofore been considered undesirable because of their high molecular weight characteristics and the tremendous difficulty involved in breaking them down by milling procedures so that they could be formed into factory processable compounds. The above cited article in Rubber Age is an abstract of an article entitled "Butadiene Polymers and Polyisobutylene" which appears in Industrial and Engineering Chemistry, January 1950, pages 95 to 102. As there set forth, one of the alfin catalysts is a complex of the sodium compounds of alcohol and an olefin. For example, sodium propoxide-allyl sodium. The catalysts are generally sodium alkyls complexed with an ether and/or alcohol as described in the above article.

It is apparent that modification of the invention may be made without changing the spirit thereof, and it is intended that the invention be limited only by the appended claims.

What we claim is:

1. The process of producing a workable rubbery polymerization product that comprises a polymer of a conjugated diolefin of at least 90 Mooney viscosity that has a substantially undeteriorated molecular structure and that contains at least 50% by weight of said conjugated diolefin having not in excess of 8 carbon atoms and at least 20%, based on the weight of said product, of an oily liquid hydrocarbon plasticizer that is compatible with said polymer that has a boiling point above 450° F. and that is interspersed through it which comprises mixing said plasticized with compounds that are polymerizable to form said polymer and polymerizing said compounds in the presence of said plasticizer and of an ionic catalyst which is a complex of the sodium compounds of an alcohol and olefin.

2. The process as set forth in claim 1 in which the catalyst is a sodium isopropoxide-allyl sodium.

References Cited in the file of this patent

UNITED STATES PATENTS

| 2,512,697 | Te Grotenhuis | June 27, 1950 |
| 2,553,651 | Gessler | May 22, 1951 |
| 2,576,968 | Pike et al. | Dec. 4, 1951 |

FOREIGN PATENTS

| 123,533 | Australia | Feb. 20, 1947 |
| 152,872 | Australia | Aug. 18, 1953 |

OTHER REFERENCES

Shearon: Industrial and Engineering Chemistry, volume 40, No. 5, pages 769–777, May 1948.

D'Ianni: Industrial and Engineering Chemistry, volume 42, No. 1, pages 95–102, January 1950.

Morton: Industrial and Engineering Chemistry, volume 42, No. 8, pages 1488–1496, August 1950.

UNITED STATES PATENT OFFICE
CERTIFICATE OF CORRECTION

Patent No. 3,074,902　　　　　　　　　　　　January 22, 1963

Emert S. Pfau et al.

It is hereby certified that error appears in the above numbered patent requiring correction and that the said Letters Patent should read as corrected below.

In the heading to the drawing, line 4, for "PLASTICIXER" read -- PLASTICIZER --; column 6, line 22, for "rubers" read -- rubbers --; columns 5 and 6, Table 1, under the sub-heading "3 hrs.", opposite "Golden Bear Oil Co.", line 5, insert -- 12 --; line 6, opposite "Socony Vacuum" insert -- 31 --; line 7, opposite "Socony Vacuum" insert -- 3 --; column 8, line 52, for "plasticized" read -- plasticizer --.

Signed and sealed this 27th day of August 1963.

(SEAL)
Attest:

ERNEST W. SWIDER
Attesting Officer

DAVID L. LADD
Commissioner of Patents